United States Patent
Redecker et al.

[15] 3,693,086
[45] Sept. 19, 1972

[54] METER WITH SMALL TILT ERROR

[72] Inventors: Henry W. Redecker, Rt. 6; Eugene G. Bezgela, 351 Forsyth St., both of Raleigh, N.C. 27609

[22] Filed: March 15, 1971

[21] Appl. No.: 124,425

Related U.S. Application Data

[63] Continuation of Ser. No. 746,641, July 22, 1968, abandoned.

[52] U.S. Cl. ..................................324/155, 252/12
[51] Int. Cl. .............................................G01r 1/00
[58] Field of Search ......................324/155; 252/12

[56] References Cited

UNITED STATES PATENTS 3,143,704  8/1964  Wright......................324/155
3,453,208  7/1969  Gallagher...................252/12

OTHER PUBLICATIONS

Devine et al., " Aromatic Polyimide Compositions For Solid Lubrication," Lubrication Engr. June 1964, pg. 225- 230.

*Primary Examiner*—Alfred E. Smith
*Attorney*—A. J. Stratton

[57] ABSTRACT

An induction type meter has a rotor mounted for rotation about a vertical axis and supported vertically by a magnetic mounting. The rotor is restrained against lateral motion by ring bearings made of an aromatic polyimide resin and a filler.

5 Claims, 2 Drawing Figures

PATENTED SEP 19 1972

3,693,086

WITNESSES
Theodore F. Wrobel
James F. Young

INVENTORS
Henry W. Redecker
and Eugene G. Bezgela
BY
C.L. Freedman
ATTORNEY

METER WITH SMALL TILT ERROR

BACKGROUND OF THE INVENTION

1. Field of the Invention

This invention relates to a measuring device having a rotor arranged for continuous rotation about a vertical axis, and it relates particularly to an induction type watthour meter having magnetic mounting and having ring bearings.

Although the invention is applicable to various measuring devices having rotors arranged for rotation, it is particularly suitable for induction type watthour meters and will be described as applied to such a meter.

2. Description of the Prior Art

For many years the induction type watthour meter has employed a rotor mounted for rotation about a vertical axis and supported by a magnetic mounting. The rotor is maintained in vertical alignment by means of guide bushings or ring bearings of graphite which coact with chrome or stainless steel guide pins. Such meters are described in the Electrical Metermen's Handbook, Seventh Edition, Published in 1965 by Edison Electric Institute, New York City.

One of the troubles encountered with graphite journal bearings or guide bushings is that of tilt instability. When the axis of the rotor departs from the vertical or is tilted, a tilt performance error is introduced which changes with operating time.

The change in tilt performance for graphite journal bearings is caused at least in part by the graphite changing its surface condition due to war and thereby changing its coefficient of friction, particularly at very low loads. In addition to the changing surface condition, the graphite also has a nonlinear coefficient of friction curve with respect to load, particularly very light loads. Since the meter tilt instability is occurring at low driving torques and variable low bearing loads, graphite does not provide ideal performance.

Much effort has been expended in attempting to improve the ring bearing. In U.S. Pat. Nos. 2,953,415 and 2,965,418 reference is made to polyurethane synthetic resins and synthetic linear polyamide resins. The polyurethane resin may be mixed with modifying agents such as graphite, powdered mica or asbestos.

In the patent application of Merrion D. Gill and Eugene G. Bezgela, Ser. No. 376,940, filed June 22, 1964, now U.S. Pat. No. 3,397,929, assigned to the same assignee, reference is made to polycarbonate, crystallized acetal resin, nylon and fluorocarbon.

SUMMARY OF THE INVENTION

In accordance with the invention, a filler having good low-friction properties is added to a base material having good mechanical, thermal and chemical properties. In a preferred embodiment of the invention the filler is a fluorocarbon material and the base material is an aromatic polyimide resin. A ring bearing or bushing formed of the resultant material for induction meters not only displays excellent tilt stability but possessed other properties desirable for such a bearing or bushing.

It is therefore an object of the invention to provide a bearing for a vertical shaft which has good tilt stability.

It is also an object of the invention to provide an induction meter having a rotor mounted for rotation about a vertical axis by a magnetic mounting and ring bearings having good tilt stability.

It is another object of the invention to provide an induction meter as recited in the preceding paragraph wherein the ring bearings are constructed of a material containing a polyimide.

BRIEF DESCRIPTION OF THE DRAWINGS

Other objects will be apparent from the following description taken in conjunction with the accompanying drawings, in which.

DESCRIPTION OF THE PREFERRED EMBODIMENTS

Figure 1:
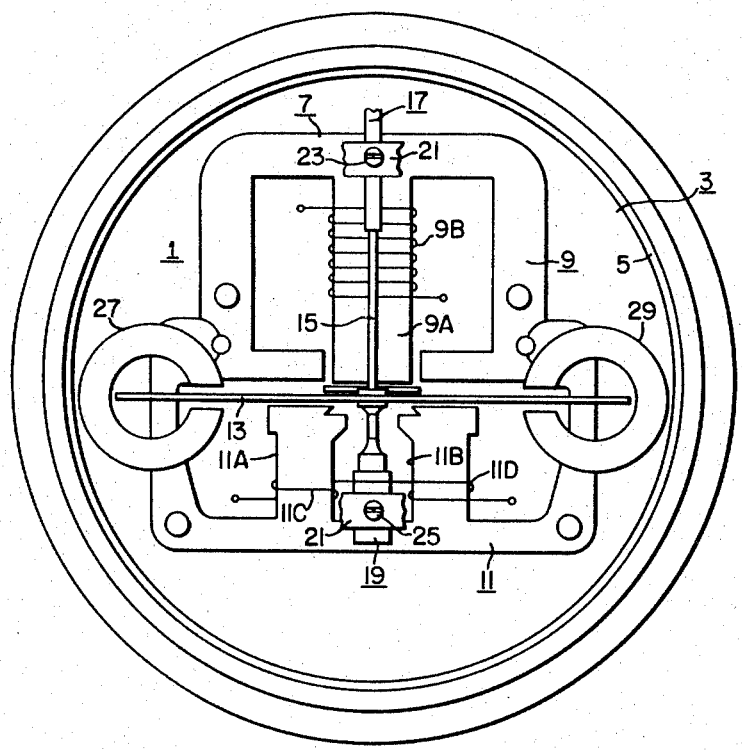
FIG. 1 is a view in front elevation with parts broken away of a watthour meter embodying the invention.
Figure 2:
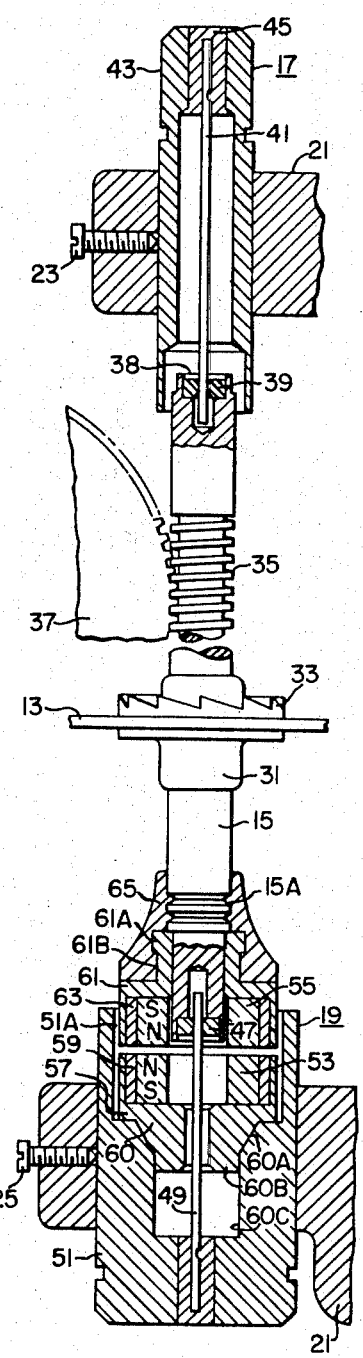
FIG. 2 is a view in side elevation with parts broken away showing the rotor assembly and associated parts of the watthour meter of FIG. 1.

In order to simplify the presentation, the invention will be described as applied to the watthour meter of the Wright U.S. Pat. No. 3,143,704, issued Aug. 4, 1964. FIGS. 1 and 2 are reproductions of, and employ similar reference characters for designating components similar to those of, FIGS. 1 and 2 of the Wright patent. For convenience, the components are listed as follows:

1 Induction type watthour meter
2 Base
5 Glass cover
7 Magnetic structure
9 Voltage section
9A Voltage pole
9B Voltage winding
11 Current section
11A, 11B Current poles
11C, 11D Current windings
13 Electroconductive disc or armature
15 Shaft
17 Upper bearing assembly
19 Lower bearing assembly
21 Frame
23, 25 Set Screws
27, 29 Damping magnets
31 Hub
35 Worm
37 Worm wheel
38 Cup-shaped recess
39, 47 Ring bearings
41, 49 Stainless steel pins
43, 51 Sleeves
45 Die casting alloy
53, 55 Permanent magnets
57, 61 Steel cups
59 Solder The components 7, 9, 9A, 9B, 11, 11A-11D form parts of an electromagnet which, when energized, applies a shifting magnetic field to the armature 13.

Except for the ring bearings 39 and 47, the structure of FIGS. 1 and 2 is identical to that of FIGS. 1 and 2 of the Wright patent. In the Wright patent the ring bearings are constructed of graphite. This material has given generally good performance. As previously noted, the performance of graphite in the field of tilt performance leaves something to be desired.

To illustrate the qualities desired in a ring bearing for an induction meter the following items are listed:
1. Low friction.

2. Tilt error within the limits of the MSJ-10 test. Test points are reference (vertical), 4° top to front, 4° top to back, 4° top to left and 4° top to right. See Test No. 15, EEI Pub. No. MSJ-10—1966—AE-IC-AIEE-NEMA Standards for Watthour Meters. Edison Electric Institute, New York City, is one of the sponsors.
3. Repetition of item 2 after operation of the meter for a period of time at maximum overloads.
4. Operation with a PV factor (bearing pressure multiplied by bearing velocity) several times maximum rating should not produce excessive wear or error.
5. Operation at elevated temperatures should not produce excessive wear or error.
6. Operation at elevated humidity and temperature should not produce excessive wear or error.

Other criteria such as machinability or moldability, resistance to solvents such as chloroethene, alcohols, and trichloroethylene resistance to ultra-violet radiation and resistance to corrosion are of importance.

The materials tested included base materials such as polycarbonate, acetyl, epoxy, fluorocarbons, polyamide, phenolic polyurethane, and aromatic polyimide materials, and fillers such as ceramic, graphite, bronze, molybdenum disulphide, glass and fluorocarbon materials. Of the base materials the aromatic polyimide material was outstanding.

Examples of aromatic polyimide resins are found in U.S. Pat. Nos. 3,179,630 to 3,179,634 inclusive and 3,179,614. An example of an aromatic polyamide imide resin is found in U.S. Pat. No. 3,179,635. Lubricant films composed of $MoS_2 + Sb_2O_3$ bonded with polyimide resins are discussed in Lubrication Engineering, July, 1967, pgs. 288–294. Aromatic polyimides filled with $WSe$, $MoS_2$ and graphite are discussed as lubricants for ball bearings in Lubrication Engineering, June 1964, pgs. 225–230.

A base material formed of an aromatic polyimide constitutes an extremely stable matrix which is resistant to solvents and ultra-violet radiation.

For a filler a fluorocarbon polymer has been found to be highly desirable. An example of a fluorocarbon polymer is polytrifluoromonochloroethylene which is available under the trade name Kel-F.

The aromatic polyimide resin is employed as a matrix to hold the filler effectively in position. A preferred fluorocarbon polymer is polytetrafluoroethylene which is available under the trade name Teflon. The filler has exceptionally low friction properties in a ring bearing. It is our theory that this low friction is due in at least part to a transfer of fluorocarbon polymer from the ring bearing to deposit on the chrome or stainless steel pins 41, 49, so that in effect a fluorocarbon polymer coated pin rotates in a fluorocarbon-polymer-containing ring bearing.

We presently prefer to employ a filler comprising 30 to 45 percent by weight of the polyimide resin but fillers outside this range (such as in a range of 4 to 80 percent) may be employed. The filler may be mixed in finely divided or powdered form (for example a powder particle size of ½ to 20 microns or smaller) into an aromatic polyimide liquid or varnish. After it has hardened, the resultant material may be used in sheet form or ground into a powder and sintered into the desired shape.

A polyimide material is listed for non-lubricated bearings under the trade name Meldin PI-30X in various molded shapes by the Dixon Corporation, Bristol, Rhode Island and under the trade name Vespel by the E.I. du Pont de Nemours & Co. (Inc.), Wilmington, Delaware. Inasmuch as it is machinable it may be procured in sheet form and the ring bearings then may be machined from the sheet.

The fluorocarbon polymer alone tends to creep or cold flow under pressure and does not machine well. However, the aromatic polyimide resin addition causes the resultant material to resist cold flow and to be readily machinable. Furthermore the material may be employed at elevated temperatures, such as 125° C. or more. It is highly resistant to corrosion, humidity, solvents and ultra-violet radiation. It also withstands cold running at −40° C. and cycling between −40° and 125° C.

The pins 41, 49 may be of other resilient material such as beryllium copper. However, stainless steel is preferred, in part because of its resistance to corrosion.

To illustrate the performance of the invention MSJ-10 light-load tests were conducted on induction watthour meters 3 and 4 which were similar to those shown in the aforesaid Wright patent and on induction watthour meters 1 and 2 which were similar to the meters 3 and 4 except that the graphite ring bearings were replaced by the aromatic polyimide resin and polytetrafluoroethylene filler ring bearings described above. The results of the tests are compiled in Table I below, and show the much greater stability and the lower maximum per cent error of the ring bearings of the invention.

TABLE I

|  | Percent error | | Percent error | |
| --- | --- | --- | --- | --- |
|  | Meter No. 1 | Meter No. 2 | Meter No. 3 | Meter No. 4 |
| 4° Tilt, top to front: | | | | |
| Start | −.28 | −.28 | −.87 | −.54 |
| After 7 days | −.23 | −.22 | −.51 | −.72 |
| After 14 days | −.20 | −.33 | −1.69 | −.97 |
| After 21 days | −.26 | −.27 | −1.65 | −1.06 |
| After 28 days | −.27 | −.26 | −1.32 | −.86 |
| After 35 days | −.31 | −.45 | −1.05 | −.60 |
| 4° Tilt top to rear: | | | | |
| Start | +.03 | −.12 | +1.55 | +.85 |
| After 7 days | +.03 | 00 | +.68 | +1.03 |
| After 14 days | +.10 | +.03 | +1.47 | +.99 |
| After 21 days | 00 | +.04 | +1.15 | +.25 |
| After 28 days | −.01 | +.06 | −.22 | −.20 |
| After 35 days | +.05 | −.09 | +1.09 | +.99 |
| 4° Tilt top to left: | | | | |
| Start | +.32 | +.39 | +.40 | +.76 |
| After 7 days | +.39 | +.43 | −1.80 | 00 |
| After 14 days | +.44 | +.43 | −1.06 | +.22 |
| After 21 days | +.41 | +.44 | −1.77 | +.05 |
| After 28 days | +.43 | +.48 | −1.66 | −.04 |
| After 35 days | +.60 | +.36 | +.75 | +1.55 |
| 4° Tilt top to right: | | | | |
| Start | −.45 | −.29 | +.41 | +.11 |
| After 7 days | −.46 | −.34 | +.03 | +.53 |
| After 14 days | −.36 | −.34 | +1.26 | +.52 |
| After 21 days | −.52 | −.43 | +.88 | +.25 |
| After 28 days | −.46 | −.40 | −.02 | +.18 |
| After 35 days | −.47 | −.28 | −.07 | +.35 |

An aromatic polyimide resin lubricating film and bearing surface is covered in the copending patent application of William M. Alvino and James H. Freeman, Ser. No. 724,728, filed Apr. 29, 1968, now U.S. Pat. No. 3,608,054 and assigned to the same assignee.

We claim as our invention:
1. An induction meter, comprising:
    a stator assembly including an electromagnet having spaced voltage and current poles,
    a rotor assembly including an electrically conductive disc disposed between the spaced voltage and current poles, bearing means mounting said rotor assembly for rotation about a substantially vertical axis relative to the stator assembly, said bearing means including means for restraining said rotor assembly from lateral movement relative to the stator assembly, comprising a ring bearing and a pin rotatably received by the ring bearing, with the axis of said pin being substantially vertical, said ring bearing having base material comprising a matrix constructed essentially of an aromatic polyimide resin, and a lubricant filler in the matrix.

2. The induction meter of claim 1 wherein the bearing means includes a magnetic mounting for providing vertical support for the rotor assembly.

3. The induction meter of claim 1 wherein the pin is a corrosion resistant metal and the lubricant filler is essentially a fluorocarbon polymer.

4. The induction meter of claim 1 wherein the lubricant filler is essentially polytetrafluoroethylene.

5. The induction meter of claim 2 wherein said rotor assembly includes a shaft, wherein said ring bearing and pin form one mounting arrangement at one end of said shaft, and wherein a second substantially identical ring bearing and pin form another mounting arrangement at an opposite end of said shaft for mounting said rotor assembly to said stator assembly.

* * * * *